US010829130B2

(12) United States Patent
Rakshit et al.

(10) Patent No.: US 10,829,130 B2
(45) Date of Patent: Nov. 10, 2020

(54) AUTOMATED DRIVER ASSISTANCE SYSTEM

(71) Applicant: International Business Machines Corporation, Armonk, NY (US)

(72) Inventors: Sarbajit K. Rakshit, Kolkata (IN); James E Bostick, Cedar Park, TX (US); John M. Ganci, Jr., Raleigh, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/175,177

(22) Filed: Oct. 30, 2018

(65) Prior Publication Data
US 2020/0130706 A1   Apr. 30, 2020

(51) Int. Cl.
| | |
|---|---|
| *B60W 50/14* | (2020.01) |
| *G06F 9/451* | (2018.01) |
| *B60W 40/09* | (2012.01) |
| *B60W 10/04* | (2006.01) |
| *B60W 30/18* | (2012.01) |
| *G06N 20/00* | (2019.01) |
| *B60W 40/08* | (2012.01) |

(52) U.S. Cl.
CPC .......... *B60W 50/14* (2013.01); *B60W 10/04* (2013.01); *B60W 30/18* (2013.01); *B60W 40/09* (2013.01); *G06F 9/453* (2018.02); *G06N 20/00* (2019.01); *B60W 2040/0872* (2013.01); *B60W 2540/00* (2013.01); *B60W 2552/00* (2020.02); *B60W 2710/30* (2013.01); *B60W 2900/00* (2013.01)

(58) Field of Classification Search
CPC ...... B60W 50/14; B60W 10/04; B60W 30/18; B60W 40/09; G06F 9/453; G06N 20/00; G02B 27/01; G02B 2027/014
See application file for complete search history.

(56) References Cited

U.S. PATENT DOCUMENTS

| | | |
|---|---|---|
| 9,082,239 B2 | 7/2015 | Ricci |
| 9,440,646 B2 | 9/2016 | Fung et al. |
| 2005/0251395 A1* | 11/2005 | Lich ...................... G02B 27/01 |
| | | 704/275 |

(Continued)

FOREIGN PATENT DOCUMENTS

CN          103927848 A       7/2014

OTHER PUBLICATIONS

Gallagher, "The holographic anime "robot" that will keep house for lonely salarymen," Arstechnica, accessed on Oct. 25, 2018, 4 pages. https://arstechnica.com/information-technology/2016/12/the-anime-girlfriend-experience-gateboxs-ai-powered-holographic-home-robot/.

(Continued)

*Primary Examiner* — Anne Marie Antonucci
*Assistant Examiner* — Andrew J Cromer
(74) *Attorney, Agent, or Firm* — Yee & Associates, P.C.

(57) ABSTRACT

Driver assistance is provided. An issue corresponding to a driver of a vehicle is automatically identified based on analysis of collected data. A set of actions is selected to address the identified issue corresponding to the driver based on the analysis of the collected data and preference data of the driver. The driver is notified of the selected set of actions to address the identified issue corresponding to the driver.

18 Claims, 4 Drawing Sheets

(56) References Cited

U.S. PATENT DOCUMENTS

| | | | |
|---|---|---|---|
| 2009/0299629 A1* | 12/2009 | Grigsby | G01C 21/3484 |
| | | | 701/469 |
| 2011/0043377 A1* | 2/2011 | McGrath | G08G 1/096775 |
| | | | 340/905 |
| 2014/0125678 A1 | 5/2014 | Wang et al. | |
| 2014/0276090 A1* | 9/2014 | Breed | A61B 5/18 |
| | | | 600/473 |
| 2015/0379362 A1 | 12/2015 | Calmes et al. | |

OTHER PUBLICATIONS

"Driver drowsiness detection," Wikipedia, Accessed Oct. 25, 2018, 4 pages. https://en.wikipedia.org/wiki/Driver_drowsiness_detection.

\* cited by examiner

AUTOMATED DRIVER ASSISTANCE SYSTEM

BACKGROUND

1. Field

The disclosure relates generally to driver safety and more specifically to providing an automated virtual driving companion to assist a driver of a vehicle in response to detected issues.

2. Description of the Related Art

For the past several years, innovations within the automotive industry have created safer vehicles. For example, most road accidents occurred due to driver error. Advanced driver-assistance systems are developed to automate, adapt, and enhance vehicle systems for safety and reduction of driver errors. These safety systems are designed to avoid collisions by alerting a driver to potential problems or to avoid collisions by automatically braking the vehicle. Adaptive features may, for example, automate headlight illumination, automate windshield wiper action, provide adaptive cruise control, avoid vehicular collisions, avoid pedestrian collisions, provide traffic warnings, provide lane departure warnings, provide automatic lane centering, and detect objects in blind spots. In other words, a vehicle may be capable of sensing its surrounding environment using a variety of technologies, such as, for example, radar, light detection and ranging, global positioning system (GPS) technology, odometry, and computer vision. Advanced driver-assistance systems interpret this sensory information provided by these various technologies to identify and avoid objects.

SUMMARY

According to one illustrative embodiment, a method for driver assistance is provided. A data processing system identifies an issue corresponding to a driver of a vehicle automatically based on analysis of collected data. The data processing system selects a set of actions to address the identified issue corresponding to the driver based on the analysis of the collected data and preference data of the driver. The data processing system notifies the driver of the selected set of actions to address the identified issue corresponding to the driver. According to other illustrative embodiments, a data processing system and computer program product for driver assistance are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
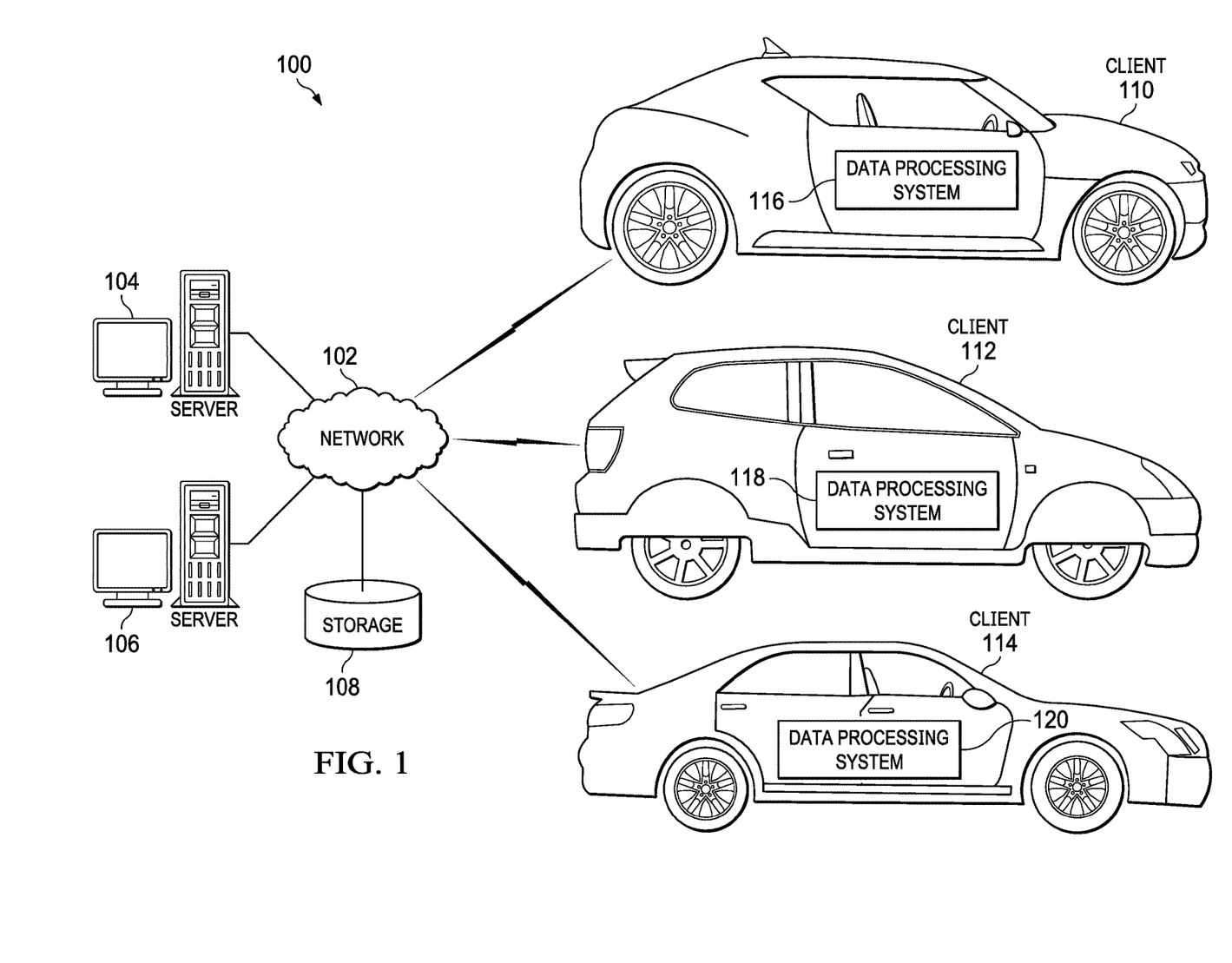
FIG. 1 is a pictorial representation of a network of data processing systems in which illustrative embodiments may be implemented.
Figure 2:
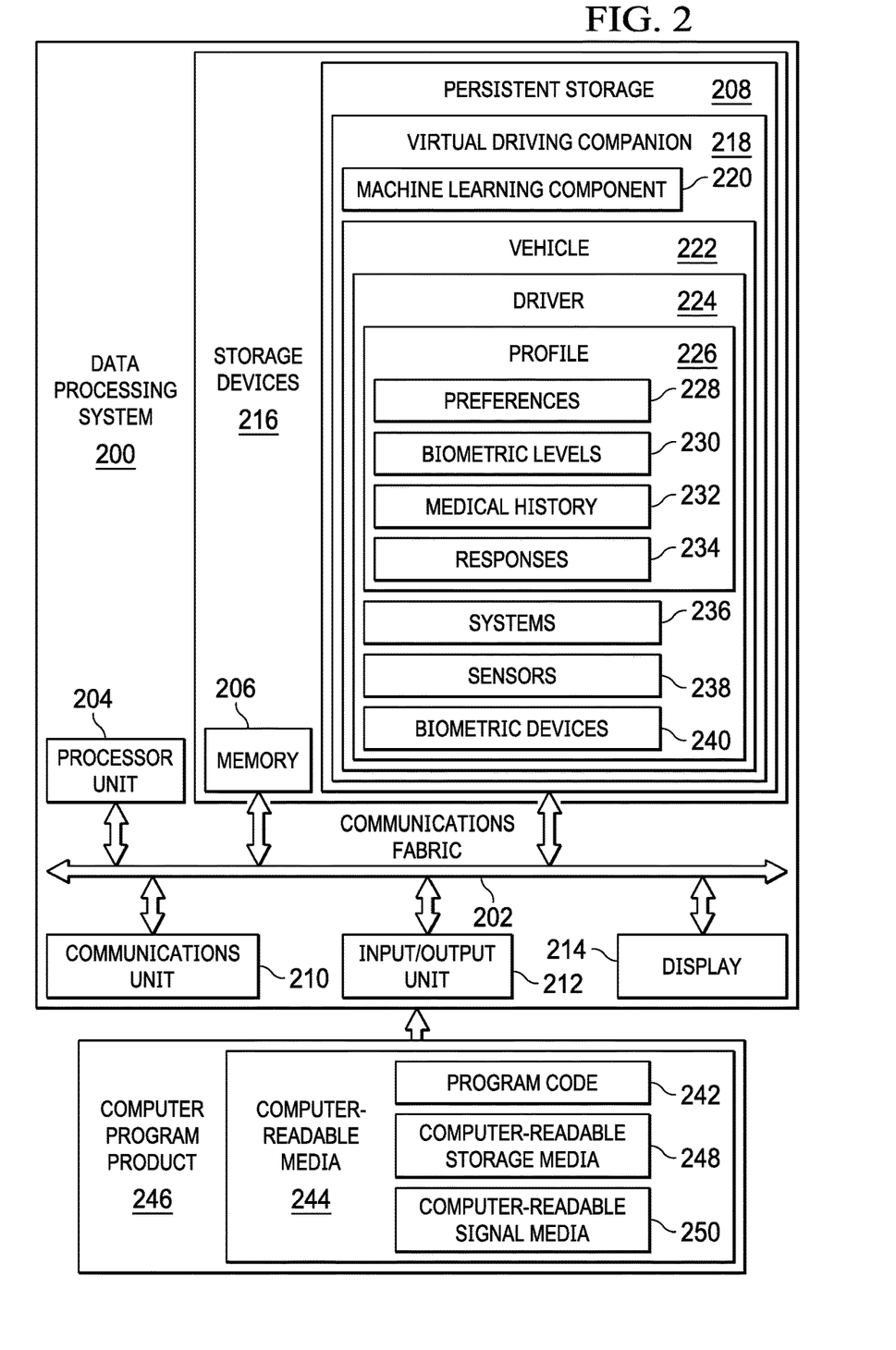
FIG. 2 is a diagram of a data processing system in which illustrative embodiments may be implemented.
Figure 3:
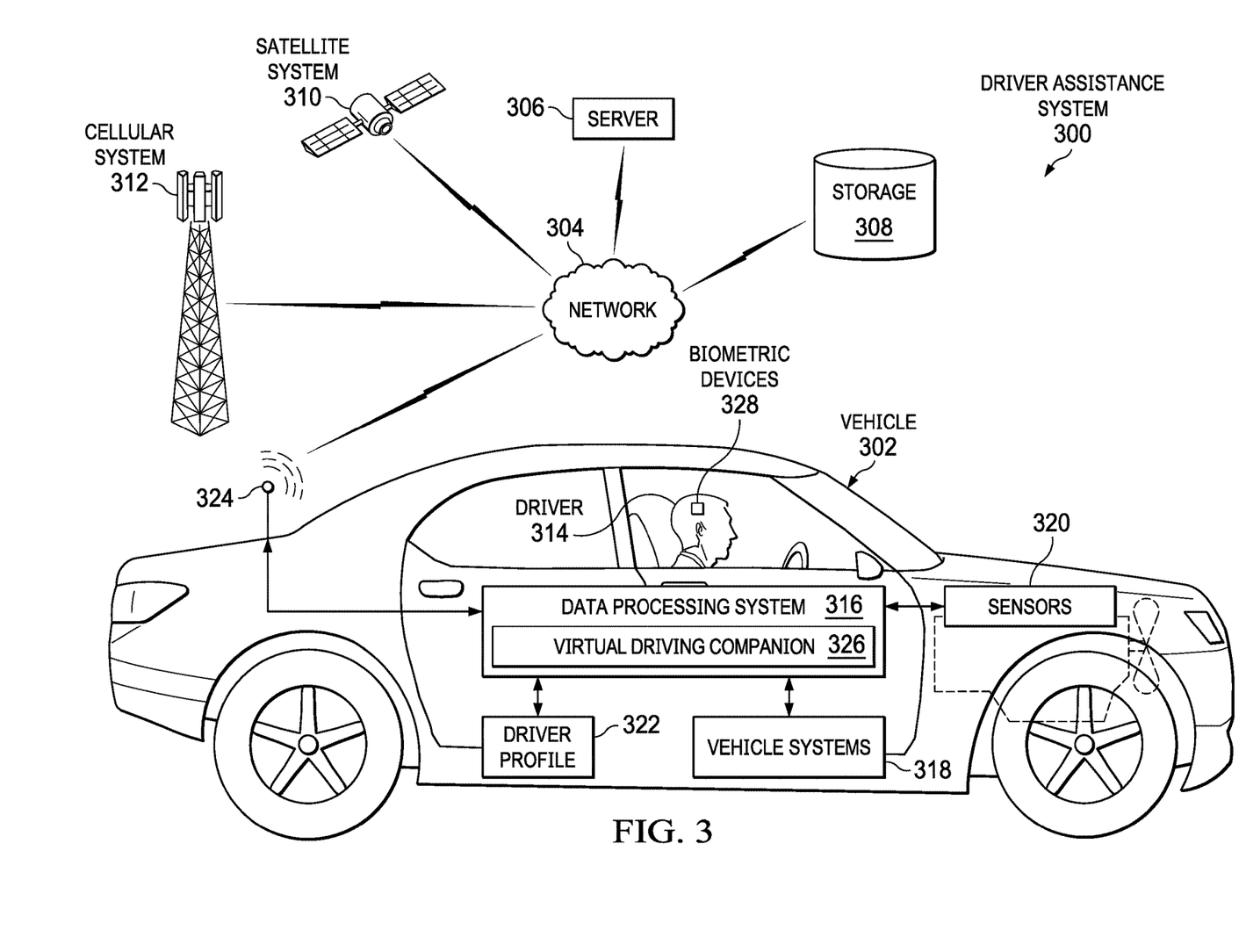
FIG. 3 is a diagram illustrating an example of a driver assistance system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide one or more services, such as, for example, event monitoring services, data services, map services, navigation services, communication services, and the like, to registered clients having data processing systems with virtual driving companion components. Server 104 and server 106 may also provide other information, such as, for example, operating system images, software applications and programs, software updates, software patches, and the like, to these registered client devices. Also, it should be noted that server 104 and server 106 may each represent a cluster of servers in different data centers. Alternatively, server 104 and server 106 may represent computing nodes in different cloud environments.

Client 110, client 112, and client 114 also connect to network 102. Clients 110, 112, and 114 are vehicles that include onboard data processing systems, such as data processing system 116, data processing system 118, and data processing system 120, respectively. The vehicles may represent any type of vehicle, such as, for example, a car, van, sport utility vehicle, truck, semi-tractor, taxi, bus, and the like. Further, these vehicles may include electric motor vehicles and combustion engine vehicles. Data processing systems 116, 118, and 120 include a virtual driving component for assisting a driver in response to detected issues, such as driver drowsiness, heart attack, epileptic seizure, and the like.

It should be noted that the data processing systems 116, 118, and 120 may be coupled, via wired or wireless communication links, to other devices, such as, for example, laptop computers, tablet computers, handheld computers, smart phones, personal digital assistants, and the like, which are located in the vehicles, for obtaining information corresponding to drivers, such as calendar entries, personal day planner entries, travel plans, and the like, and for providing possible external communication links. Data processing systems 116, 118, and 120 may also be coupled, via wired or wireless communication links, to biometric sensing devices, such as, for example, smart watches, personal exercise monitors, heart rate monitors, blood pressure monitors, skin temperature monitors, blood glucose monitors, electrical brain activity monitors, electrical heart activity monitors, and the like, for monitoring current real-time status of drivers of the vehicles. In addition, data processing systems 116, 118, and 120 may be coupled, via wired or wireless communication links, to a set of sensors, such as one or more image capturing devices (e.g., cameras) and sound capturing devices (microphones), within the vehicles for further monitoring of current real-time status of the drivers.

Storage 108 is a network storage device capable of storing any type of data in a structured format or an unstructured format. Storage 108 may also represent a plurality of network storage devices connected to network 102. Storage 108 may store information, such as, for example, lists of registered client vehicles with identifiers and specification information, lists of vehicle drivers with identifiers and profiles, driver medical histories, historic driver biometric levels, and the like. Further, storage 108 may store other types of data, such as authentication or credential data that may include user names, passwords, and biometric templates associated with drivers, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, a wireless telecommunications network, an internet, an intranet, a local area network (LAN), a wide area network (WAN), wireless fidelity (Wi-Fi), Bluetooth® technology, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer or similar type of data processing system, such as data processing system 116 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores virtual driving companion 218. However, it should be noted that even though virtual driving companion 218 is illustrated as residing in persistent storage 208, in an alternative illustrative embodiment virtual driving companion 218 may be a separate component of data processing system 200. For example, virtual driving companion may be a hardware component coupled to communication fabric 202 or a combination of hardware and software components. In another alternative illustrative embodiment, a first set of components of virtual driving companion 218 may be located in data processing system 200 and a second set of components of virtual driving companion 218 may be located in a second data processing system, such as, for example, server 104 in FIG. 1. In yet another alternative illustrative embodiment, virtual driving companion 218 may be located in the server, instead of or in addition to, data processing system 200.

Virtual driving companion 218 controls the process of detecting issues with a driver of a vehicle based on collected biometric and sensor data corresponding to the driver, making recommendations to the driver or engaging the driver in conversation to address the detected issues, and automatically performing actions to mitigate or eliminate the detected issues by controlling one or more different systems of the vehicle. Virtual driving companion 218 may be a holographically projected virtual driving companion or a voice only virtual driving companion. In this example, virtual driving companion 218 includes machine learning component 220. Machine learning component 220 may be, for example, an artificial intelligence program. Virtual driving companion 218 utilizes machine learning component 220 to analyze, classify, and learn collected data regarding the driver of the vehicle.

Vehicle 222 represents an identifier and corresponding specification information regarding the particular vehicle that data processing system 200 is located within. Vehicle 222 is operated by driver 224. Driver 224 represents a unique identifier corresponding to the particular driver currently operating vehicle 222. However, it should be noted that different drivers may operate vehicle 222 at different times and will be identified by respective unique identifiers.

Profile 226 corresponds to driver 224 who is currently operating vehicle 222. In other words, each different driver of vehicle 222 will have a different corresponding profile. In this example, profile includes preferences 228, biometric levels 230, medical history 232, and responses 234. However, is should be noted that profile 226 may contain other information, such as driver name, home address, age, and the like.

Preferences 228 represent likes and dislikes of driver 224. For example, driver 224 may like to listen to a particular genre of music (e.g., Rock music) to wake up when feeling drowsy and may dislike coffee as a pick-me-up and prefer a carbonated soft drink with high levels of caffeine instead. Similarly, driver 224 may dislike the windows rolled down to wake up when drowsy, but may instead like a lower temperature setting on the air conditioning system with a higher fan speed.

Biometric levels 230 represent historic or typical biometric readings of driver 224. For example, biometric levels 230 may include temperature of 98.6, resting heart rate of 84, resting blood pressure of 125/82, respiration rate of 14/minute, blood glucose of 94 mg/dl, an electroencephalogram, an electrocardiogram, and the like. Medical history 232 represents medical records and other medical information corresponding to driver 224. For example, medical history 232 may include history of heart disease and heart surgery, prescriptions, history of epileptic seizures, history of diabetes, history of high blood pressure, or the like.

Responses 234 represent reactions by driver 224 to recommendations made by virtual driving companion 218 to driver 224 to address an issue with driver 224 detected by virtual driving companion 218. For example, driver 224 may comply with the recommendation to stop and get a cup of coffee at a specified location when virtual driving companion 218 detected drowsiness in driver 224. Responses 234 may also include reactions by driver 224 to actions automatically performed by virtual driving companion 218 to address a detected issue with driver 224. For example, driver 224 may roll the driver's side window back up after virtual driving companion 218 automatically rolled down the window to wake up driver 224. Then, driver 224 immediately lowers the air conditioning temperature to 60 degrees and sets the fan speed on high, for example.

Responses 234 may also include lack of responses by driver 224 to recommendations or automatic actions performed by virtual driving companion 218. For example, driver 224 may ignore a recommendation by virtual driving companion 218 to pull over and rest after virtual driving companion 218 detected that blood pressure and heart rate levels of driver 224 have increased above defined threshold levels. Or, driver 224 may accept (i.e., do nothing to change) the automatic actions performed by virtual driving companion 218 regarding a particular issue. For example, virtual driving companion 218 may automatically turn on the radio, tune to a preset radio station that plays Rock-n-Roll music, and turn up the volume when virtual driving companion 218 detected that driver 224 was drowsy and driver 224 did nothing to change the radio at that time. Also, machine learning component 220 learns from responses 234 over time.

Systems 236 represent subsystems of vehicle 222 that virtual driving companion 218 receives data and information from regarding, for example, current status and settings of systems 236. Systems 236 include, for example, air conditioning system, audio system, navigation system, GPS system, braking system, steering system, window system, communication system, and the like. In addition, virtual driving companion 218 may automatically control one or more of systems 236 in response to a detected issue with driver 224. For example, virtual driving companion 218 may automatically steer vehicle 222 over to the shoulder of the road and stop vehicle 222 after detecting that driver 224 suffered a heart attack and is unresponsive based on data received from sensors 238 and biometric devices 240.

Sensors 238 include a set of one or more devices, such as imaging devices (e.g., video cameras, still picture cameras, infrared cameras, and the like) to capture and analyze images of driver 224 and sound capturing devices (e.g., microphones and the like) to capture and analyze utterances and sounds made by driver 224. It should be noted that sensors 238 may also include a drowsiness detection device. Also, virtual driving companion 218, using facial recognition technology, may identify driver 224 from data obtained from the imaging sensors.

Biometric devices 240 include a set of one or more biometric devices to detect and analyze current biometric readings of driver 224. Biometric devices 240 include, for example, a heart rate monitor, a blood pressure monitor, a pacemaker, a skin temperature monitor, a blood glucose monitor, a portable electroencephalograph, a portable electrocardiograph, and the like. Virtual driving companion 218 compares the data collected from biometric devices 240 with biometric levels 230 to detect issues with driver 224.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, Wi-Fi, Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. In addition, input/output unit 212 may provide a connection for output to the user through a speaker or audio system. Display 214 provides a mechanism to display information to the user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of nontangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

When a driver of a vehicle has one or more traveling companions during an extended road trip, one or more of these companions usually stay awake and talk to the driver to make sure the driver is alert and doing fine. These companions may also help the driver decide when it is time to pull over and let someone else drive or to stop for coffee or some other type of caffeinated drink, such as an energy boosting drink. These companions can also help determine if a more serious issue, such as a medical-related issue (e.g., heart attack or stroke), is occurring with the driver. However, none of these traveling companion benefits exists when a driver is taking a road trip alone. Drowsiness detection systems currently exist in some vehicles, but these systems merely set off alarms of some kind to alert the driver. At or before the start of long eye blinking and head bobbing, illustrative embodiments, knowing the driver's biometric levels, preferences, and previous responses, can act like a human traveling companion and talk to the driver by making specific recommendations, asking the driver for responses to specific questions, and/or automatically performing specific actions by controlling one or more systems of the vehicle.

For example, the virtual driving companion of illustrative embodiments may say "Hey John, you look sleepy, so I'm going to play your favorite heavy metal music loudly." The virtual driving companion knows that this type of music will keep John alert until the next rest stop or city along the travel route. The virtual driving companion can find and play this music on a compact disc or tune the radio to a preset station that plays that type of music, for example. As another example, the virtual driving companion may say "Hey John, your body temperature is slightly elevated and you look drowsy, I'm going to adjust the air conditioning system to a lower temperature and play your favorite heavy metal music." As yet another example, the virtual driving companion may know which programming excites the driver and say "John, I found a football game on FM radio station XX.7, do you want me to tune to that station?"

In addition, the virtual driving companion may determine that John is driving along a route he typically takes to a particular location (e.g., physical fitness center), or may determine where John is driving based on an electronic calendar or personal day planner entry, or may determine where John is driving based on a travel destination input into a navigation system of the vehicle. Further, the virtual driving companion over time may learn what Jim needs when he goes to a particular location. For example, after predicting where the driver is going, the virtual driving companion may ask, "Hey John, I believe you are headed to the physical fitness center, did you remember to bring your water bottle, towel, and weight lifting gloves?"

Moreover, the virtual driving companion may engage the driver in conversation on a predetermined time interval basis or on a random time interval basis to determine whether the driver is alert. For example, the virtual driving companion may ask, "Hey, John, how are you feeling right now?" Alternatively, the virtual driving companion may ask for answers to simple trivia questions retrieved from the Internet, for example.

Furthermore, the virtual driving companion may invoke a reminder component that stores reminders to be used during subsequent trips. For example, the virtual driving component may ask, "Is there anything you want me to remember for you on subsequent trips that are the same or similar to this trip?"

In addition, the virtual driving companion may detect that an issue is ongoing, such as drowsiness that does not stop, and recommend an appropriate course of action. For example, for extended drowsiness, the virtual driving companion may recommend staying at a motel chain the driver likes just a mile ahead, or may recommend stopping at a particular coffee shop along the route to get a hot cup of coffee (i.e., if the driver likes coffee), or may recommend pulling over at a convenience store ahead to find an energy boosting drink that the driver likes.

The virtual driving companion may also recommend vehicle speed to the driver. For example, the virtual driving companion, knowing the roads and current driving conditions, may tell the driver to reduce speed to a specified level, such as, for example, 30 miles per hour, due to detected black ice conditions or the approach of a detected sharp curve in the road. Further, the virtual driving companion may know that there is an accident on the road ahead and say to the driver, "John, there is an accident ahead, let me check into it." After searching and scanning for accident information on, for example, social traffic sites and police and emergency vehicle scanners, the virtual driving companion may say, "The accident is on the left shoulder, you should move over to the right lane as soon as possible."

Illustrative embodiments detect specific issues with drivers, while controlling vehicle functions, such as, for example, audio and air conditioning systems, to help alleviate the detected issues. In addition, illustrative embodiments provide driver recommendations, such as, for example, directing a driver to the nearest gas station, restaurant, or coffee shop to help alleviate the detected issues. Further, illustrative embodiments track and record specific detected issues with the driver over time, along with the driver's likes and dislikes and responses to previous recommendations, to provide more accurate issue assessments and recommendations and automatically take appropriate action when needed. Illustrative embodiments may provide the virtual driving companion as a holographically projected driving companion or as a voice only driving companion. Illustrative embodiments trigger the virtual driving companion into action by analyzing biometrics of the driver and operation of the vehicle. For example, if illustrative embodiments determine driver drowsiness by detecting droopy eyelids and the vehicle crossing lane markers without turn signal activation, then illustrative embodiments direct the virtual driving companion to generate one or more recommendations to the driver to alleviate the drowsiness based on driver preferences and/or control one or more systems of the vehicle, such as automatically opening the driver's side window and increasing volume of the audio system to wake up the driver. Like a human companion, illustrative embodiments may also make recommendations or give reminders based on detecting a known travel destination.

Illustrative embodiments may utilize driver drowsiness detection systems to determine whether the driver is falling asleep and trigger the virtual driving companion to take appropriate action. Illustrative embodiments may also utilize GPS and navigation systems to determine where the driver is headed and remind the driver regarding items that the driver may need at that location. Illustrative embodiments may also utilize the GPS and navigation systems to locate businesses that sell products the driver needs to wake up, get hydrated, or the like. Illustrative embodiments may utilize biometric devices to measure the driver's current health status. For example, illustrative embodiments may utilize different types of biometric devices to monitor and record heart rate, body temperature, hydration levels, blood pressure, glucose levels, brain electrical activity, heart electrical activity, and the like. Illustrative embodiments may also utilize imaging devices, such as video cameras, still picture cameras, infrared cameras, and the like, and an image analysis component to identify the driver and then retrieve a profile that contains, preferences, normal biometric values, medical history, and the like, corresponding to that driver. Illustrative embodiments may also utilize paired smart devices, such as a smart watch, to identify the driver and collect biometric data.

Some configuration of the virtual driving companion may be needed to ensure knowledge of the driver and vehicle systems. The virtual driving companion continues to learn over time by tracking driver decisions and responses to actions performed and recommendations given by the virtual driving companion. The driver may configure the virtual driving component to talk to the driver randomly just to keep the driver company on road trips longer than 60 miles, for example. Alternatively, the driver may set a timer, such as every 10 or 20 minutes, to trigger the virtual driving companion to talk to the driver. The virtual driving companion may automatically engage the driver in conversation based on what the virtual driving companion detects via imaging devices pointing at the driver. Further, the driver may direct the virtual driving companion to tune to a particular radio station at a set volume upon detection of a certain level of driver drowsiness. Further, the driver may input the kinds of snacks and beverages that the driver wants when drowsy so that the virtual driving companion can map directions to an establishment that sells those types of snacks and beverages upon detection of drowsiness. Furthermore, the driver can pair smart devices, such as smart watches, exercise monitors, and the like, to the vehicle for communication with the virtual driving companion. These paired smart devices can provide driver biometric information to the virtual driving companion. For example, information from a smart watch may indicate a significant change in heart rate or body temperature of the driver.

The virtual driving companion may detect drowsiness beyond a second drowsiness threshold limit and automatically perform an elevated action step, such as, for example, "John, pull vehicle over to the side of the road now!" or automatically slow and pull the vehicle over to the shoulder and stop the vehicle. Alternatively, the virtual driving companion may detect, via an imaging system within the vehicle, a bottle of energy boosting drink on the passenger seat and direct the driver to drink it or direct the driver to take the next exit where a favorite coffee shop is located.

Further, the virtual driving companion may know the driver's medical history and detect, via coupled biometric devices, low blood sugar levels and say "John, you need to eat a piece of fruit, especially if you've recently taken your insulin" or if high blood sugar levels are detected say "John, you need to take your insulin." Furthermore, the virtual driving companion may detect driver dehydration and say, "John, drink some water, I detect a half full bottle of water in the cup holder" or "John, exit here and get some water, you need it."

Moreover, the virtual driving companion may detect blood pressure and/or heart rate issues and say, "John, pull over to the side of the road and calm down" or "John, shall I play soothing music for you to relax?" depending on detected blood pressure and heart rate levels. If detected biometric levels are above defined thresholds, then the virtual driving companion may say "John, follow my directions to the nearest emergency center, you need medical assistance." Or, if the virtual driving companion determines that the driver has become unresponsive or incapacitated and detected biometric levels are below defined thresholds, then the virtual driving companion my say, "John, I am calling for help now" and use the communication system or a coupled smart phone, for example, to call emergency responders to the current location of the vehicle.

The virtual driving companion tracks instructions and recommendations made to the driver and also tracks responses or lack of responses by the driver to those instructions and recommendations. It should be noted that the driver may also override any automatic action, such as automatic opening of the windows, performed by the virtual driving companion. When the virtual driving companion collects enough information above a defined threshold level where an instruction, recommendation, or automatic action, is not followed or reversed by the driver, the virtual driving companion records this information in a driver profile for future reference and utilizes a machine learning component to learn the driver's preferences (e.g., likes and dislikes) over time.

With reference now to FIG. 3, a diagram illustrating an example of a driver assistance system is depicted in accordance with an illustrative embodiment. Driver assistance system 300 may be implemented in a network of data processing systems, such as network data processing system 100 in FIG. 1. Driver assistance system 300 is a system of hardware and software components for detecting issues with a driver of a vehicle based on collected biometric and sensor data corresponding to the driver, making recommendations to the driver or engaging the driver in conversation to address the detected issues, and automatically performing actions to mitigate or eliminate the detected issues by controlling different systems of the vehicle.

In this example, driver assistance system 300 includes vehicle 302, network 304, server 306, storage 308, satellite system 310, and cellular system 312. However, it should be noted that driver assistance system 300 is intended as an example only and not as a limitation of illustrative embodiments. In other words, driver assistance system 300 may include more or fewer components than shown and may include any number of the same component.

Vehicle 302 may be, for example, client 110 in FIG. 1. It should be noted that vehicle 302 may represent any type of vehicle, such as an automobile, a truck, a van, a semi-tractor, a bus, and the like. In this example, vehicle 302 includes driver 314, data processing system 316, vehicle systems 318, sensors 320, driver profile 322, and antenna 324. However, it should be noted that vehicle 302 may include other systems, devices, and data not shown.

Driver 314 represents the person that is currently operating vehicle 302. Data processing system 316 may be, for example, data processing system 200 in FIG. 2. Data processing system 316 provides the data processing capabilities of vehicle 302 and includes virtual driving companion 326. Virtual driving companion 326 may be, for example, virtual driving companion 218 in FIG. 2. Virtual driving companion 326 is communicatively coupled to vehicle systems 318, sensors 320, driver profile 322, antenna 324, and biometric devices 328.

Vehicle systems 318 represent subsystems of vehicle 302. Vehicle systems 318 include, for example, an air conditioning system, an audio system, a navigation system, a GPS system, a braking system, a steering system, a window system, a communication system, and the like. Virtual driving companion 326 collects data and information from vehicle systems 318. For example, the GPS system provides the coordinates for identification of the current geographic location of vehicle 302. In addition, driver 314 may manually enter information, such as, for example, travel destination, travel route, travel destination time, and the like, into the navigation system. In addition, virtual driving companion 326 may automatically control one or more systems of systems 318 in response to detecting an issue or problem with driver 314 based on data collected from sensors 320 and biometric devices 328.

Sensors 320 represent a set of one or more sensors for monitoring driver 314 while operating vehicle 302. Sensors 320 may include, for example, imaging and sound sensors. Biometric devices 328 represent a set of one or more biometric devices that measure current biometric levels of driver 314. Biometric devices 328 may include wearable biometric devices, such as smart watches or smart clothing, or implanted biometric devices, such as smart pacemakers. In addition, biometric devices 328 may also include portable biometric devices, such as a miniature electrocardiograph, connected to vehicle 302. Driver profile 322 include information corresponding to driver 314, such as preferences. Driver profile 322 may be, for example, profile 226 of driver 224 in FIG. 2.

Vehicle 302 may use antenna 324 to send data to and receive data from server 306, storage 308, satellite system 310, and cellular system 312. Even though antenna 324 is depicted as an external antenna in this example, antenna 324 may be an internal antenna located in, for example, a communication unit, such as communications unit 210 in FIG. 2, within data processing system 316. Further, it should be noted that any form of wireless communication, such as, for example, radio transmission, microwave transmission, cellular telephone transmission, wireless Web transmission, Wi-Fi transmission, Bluetooth transmission, or any combination thereof, may be employed for communication purposes within and between the different components comprising driver assistance system 300.

Network 304 may be, for example, network 102 in FIG. 1. Network 304 provides communication between the vehicle 302, server 306, storage 308, satellite system 310, and cellular system 312. However, it should be noted that network 304 may provide communication with other systems and devices not shown.

Server 306 may provide information and/or services to vehicle 302. Vehicle 302 is a client of server 306. In addition, server 306 may collect and track information received from vehicle 302. Server 306 may be, for example, server 104 in FIG. 1. In addition, server 306 may represent a plurality of server computers connected to network 304.

Storage 308 may be, for example, storage 108 in FIG. 1. Storage 308 may store, for example, identifiers for a plurality of vehicles, identifiers for a plurality of drivers, driver profiles, driver medical records, and the like. In addition, storage 308 may represent a plurality of different storage devices connected to network 304.

Satellite system 310 may be, for example, a network of GPS satellites. GPS is a satellite-based radio navigation system. GPS is designed so that signals from at least four satellites are available anywhere on earth, which are sufficient to compute the current geographic location of a GPS transceiver located on vehicle 302.

Cellular system 312 may be, for example, a network of regional, national, or global cellular telephone equipment provided by a public or private telecommunications carrier. The cellular telephone equipment may include, for example, a network of cell towers, Evolved Node B towers, and/or satellites. Vehicle 302 may use cellular system 312 for sending and receiving data, as well as for voice and textual communication purposes. In addition, vehicle 302 may utilize cellular system 312 to provide temporary geographic location data when, for example, GPS data signals are not available from satellite system 310.

Figure 4:
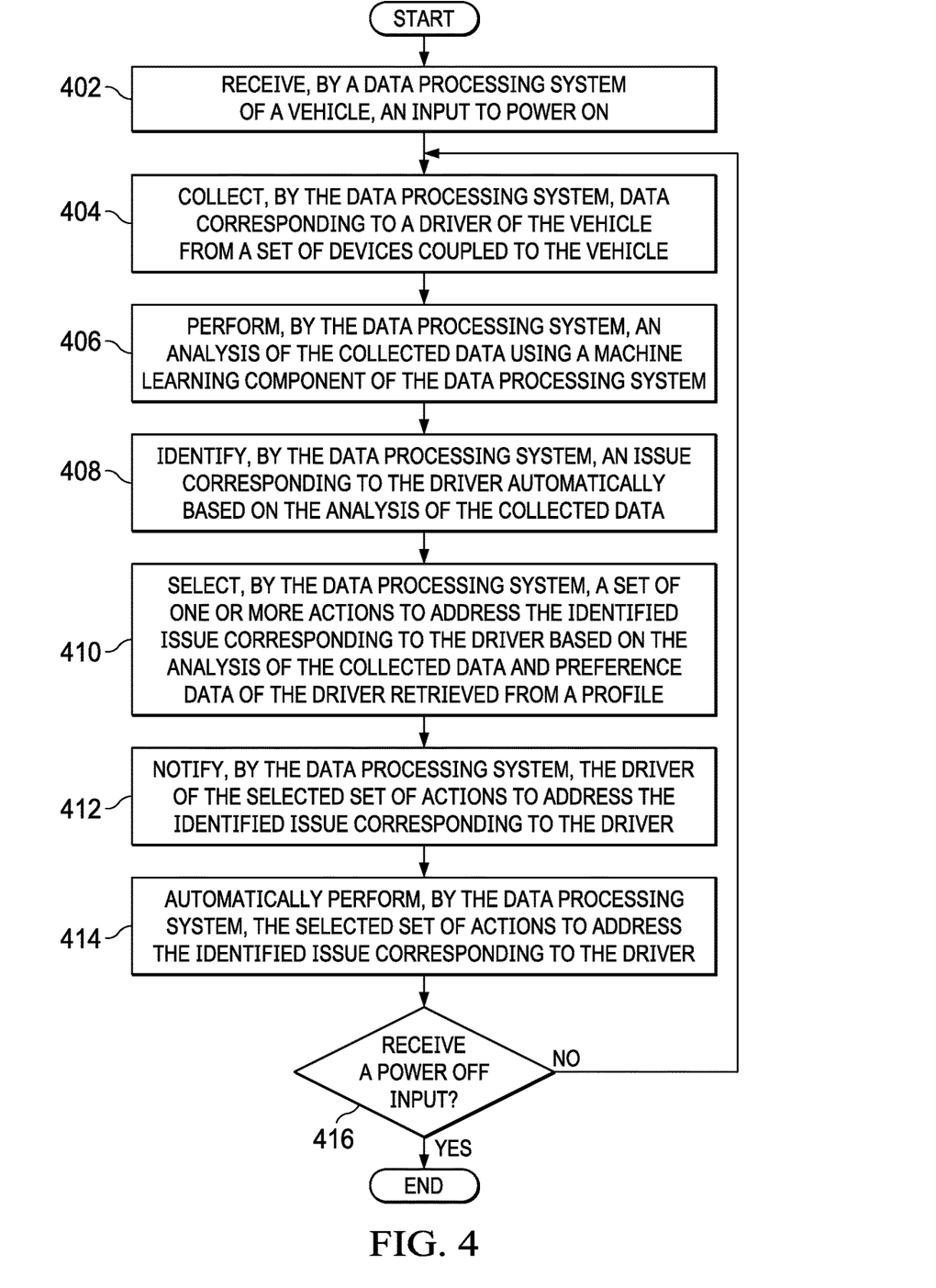
FIG. 4 is a flowchart illustrating a process for providing driver assistance in accordance with an illustrative embodiment.

With reference now to FIG. 4, a flowchart illustrating a process for providing driver assistance is shown in accordance with an illustrative embodiment. The process shown in FIG. 4 may be implemented in a data processing system, such as, for example, data processing system 116 in FIG. 1, data processing system 200 in FIG. 2, or data processing system 316 in FIG. 3, of a vehicle.

The process begins when the data processing system receives an input to power on (step 402). After powering on, the data processing system collects data corresponding to a driver of the vehicle from one or more devices coupled to the vehicle (step 404). The one or more devices may be, for example, sensors and biometric devices. The sensors may include an imaging device, such as a camera, that captures images of the driver. In addition, the data processing system may utilize a facial recognition component to automatically identify the driver of the vehicle.

Further, the data processing system performs an analysis of the collected data using a machine learning component of the data processing system, such as machine learning component 220 in FIG. 2 (step 406). Furthermore, the data processing system identifies an issue corresponding to the driver automatically based on the analysis of the collected data (step 408). Moreover, the data processing system selects a set of one or more actions to address the identified issue corresponding to the driver based on the analysis of the collected data and preference data of the driver retrieved from a profile (step 410). The profile may be, for example, driver profile 322 in FIG. 3.

The data processing system notifies the driver of the selected set of actions to address the identified issue corresponding to the driver (step 412). The data processing system may notify the driver using, for example, an audio system and/or a display system of the vehicle. The data processing system may utilize the audio system to output a machine-generated voice to alert the driver to the identified issue and make recommendations, for example. As another example, the data processing system may utilize the display system to output a textual message to the user regarding the identified issue and any possible actions to be taken by the data processing system to address the identified issue. In addition, the data processing system automatically performs the selected set of actions to address the identified issue corresponding to the driver (step 414).

Afterward, the data processing system makes a determination as to whether the data processing system received a power off input (step 416). If the data processing system determines that the data processing system did not receive a power off input, no output of step 416, then the process returns to step 404 where the data processing system continues to collect data corresponding to the driver. If the data processing system determines that the data processing system did receive a power off input, yes output of step 416, then the data processing system powers off and the process terminates thereafter.

Thus, illustrative embodiments of the present invention provide a method, data processing system, and computer program product for providing an automated virtual driving companion to assist a driver of a vehicle in response to detected issues. The virtual driving companion of illustrative embodiments differs from current solutions in that the virtual driving companion is not just configured to respond to driver commands, but that the virtual driving companion is also configured to monitor what is happening with the driver in real-time and detect what that driver needs based on the collected real-time information and historic information of the user. The virtual driving companion is able to detect drowsiness or any other health-related issue and respond by controlling systems and devices within the vehicle, such as, for example, automatically playing a favorite fast song on the audio system to stimulate the driver, talking to the driver and asking questions requiring a response, and making recommendations based on issue detection, such as, for example, recommending that the driver stop for coffee at a convenience store located 2.3 miles ahead.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for driver assistance, the method comprising:
identifying, by a data processing system, an issue corresponding to a driver of a vehicle automatically based on analysis of collected data;
selecting, by the data processing system, a set of actions to address the identified issue corresponding to the driver based on the analysis of the collected data and preference data of the driver;
notifying, by the data processing system, the driver of the selected set of actions to address the identified issue corresponding to the driver; and
searching, by the data processing system, social traffic information to detect road conditions, wherein a virtual driving companion of the vehicle determines that the driver is going to a particular location based on an electronic calendar entry and reminds the driver to bring certain objects needed for that particular location based on stored reminders in a reminder component, and wherein the virtual driving companion of the vehicle based on detected road conditions in the social traffic information recommends a specified vehicle speed and a specified lane of traffic to the driver.

2. The method of claim 1 further comprising:
automatically performing, by the data processing system, the selected set of actions to address the identified issue corresponding to the driver.

3. The method of claim 1, wherein the data processing system is located on board the vehicle, and wherein the data processing system utilizes a holographically projected virtual driving companion to notify the driver of the selected set of actions to address the identified issue corresponding to the driver.

4. The method of claim 1, wherein the selected set of actions to address the identified issue corresponding to the driver includes one or more of making a recommendation to the driver to address the identified issue, engaging the driver in conversation requiring a driver response to address the identified issue, and automatically controlling one or more systems of the vehicle to address the identified issue.

5. The method of claim 1, wherein the data processing system retrieves a stored profile corresponding to the driver that includes driver preferences regarding likes and dislikes of the driver to wake up when drowsy, historic biometric levels of the driver, medical history of the driver, and responses by the driver to previous recommendations and actions made by the virtual driving companion to address issues with the driver, and wherein the virtual driving companion records the responses by the driver to the previous recommendations and actions made by the virtual driving companion in the stored profile and utilizes a machine learning component of the virtual driving companion to learn the driver preferences.

6. The method of claim 1 further comprising:
collecting, by the data processing system, data corresponding to the driver from a set of devices coupled to the vehicle; and performing, by the data processing system, the analysis of the collected data using a machine learning component of the data processing system.

7. The method of claim 6, wherein the set of devices includes one or more sensors and one or more biometric devices.

8. The method of claim 7, wherein the one or more sensors include at least one imaging device that captures images of the driver.

9. The method of claim 7, wherein the one or more biometric devices include a driver implanted biometric device wirelessly coupled to the vehicle.

10. The method of claim 1, wherein the virtual driving companion of the vehicle engages the driver in conversation on one of a predetermined time interval basis or a random time interval basis to determine whether the driver is alert.

11. The method of claim 1, wherein the identified issue corresponding to the driver is a driver health-related issue.

12. A data processing system for driver assistance, the data processing system comprising:
a bus system;
a storage device connected to the bus system, wherein the storage device stores program instructions; and
a processor connected to the bus system, wherein the processor executes the program instructions to:
identify an issue corresponding to a driver of a vehicle automatically based on analysis of collected data;
select a set of actions to address the identified issue corresponding to the driver based on the analysis of the collected data and preference data of the driver;
notify the driver of the selected set of actions to address the identified issue corresponding to the driver; and
search social traffic information to detect road conditions, wherein a virtual driving companion of the vehicle determines that the driver is going to a particular location based on an electronic calendar entry and reminds the driver to bring certain objects needed for that particular location based on stored reminders in a reminder component, and wherein the virtual driving companion of the vehicle based on detected road conditions in the social traffic information recommends a specified vehicle speed and a specified lane of traffic to the driver.

13. The data processing system of claim 12, wherein the processor further executes the program instructions to:
automatically perform the selected set of actions to address the identified issue corresponding to the driver.

14. A computer program product for driver assistance, the computer program product comprising a computer readable storage medium having program instructions embodied therewith, the program instructions executable by a data processing system to cause the data processing system to perform a method comprising:
identifying, by the data processing system, an issue corresponding to a driver of a vehicle automatically based on analysis of collected data;
selecting, by the data processing system, a set of actions to address the identified issue corresponding to the driver based on the analysis of the collected data and preference data of the driver;
notifying, by the data processing system, the driver of the selected set of actions to address the identified issue corresponding to the driver; and
searching, by the data processing system, social traffic information to detect road conditions, wherein a virtual driving companion of the vehicle determines that the driver is going to a particular location based on an electronic calendar entry and reminds the driver to bring certain objects needed for that particular location based on stored reminders in a reminder component, and wherein the virtual driving companion of the vehicle based on detected road conditions in the social traffic information recommends a specified vehicle speed and a specified lane of traffic to the driver.

15. The computer program product of claim 14 further comprising:
automatically performing, by the data processing system, the selected set of actions to address the identified issue corresponding to the driver.

16. The computer program product of claim 14, wherein the data processing system is located on board the vehicle, and wherein the data processing system utilizes a holographically projected virtual driving companion to notify the driver of the selected set of actions to address the identified issue corresponding to the driver.

17. The computer program product of claim 14, wherein the selected set of actions to address the identified issue corresponding to the driver includes one or more of making a recommendation to the driver to address the identified issue, engaging the driver in conversation requiring a driver response to address the identified issue, and automatically controlling one or more systems of the vehicle to address the identified issue.

18. The computer program product of claim 14, wherein the data processing system retrieves a stored profile corresponding to the driver that includes driver preferences regarding likes and dislikes of the driver to wake up when drowsy, historic biometric levels of the driver, medical history of the driver, and responses by the driver to previous recommendations and actions made by the virtual driving companion to address issues with the driver, and wherein the virtual driving companion responses by the driver to the previous recommendations and actions made by the virtual driving companion in the stored profile and utilizes a machine learning component of the virtual driving companion to learn the driver preferences.

* * * * *